US012750421B2

(12) United States Patent
Joseph et al.

(10) Patent No.: US 12,750,421 B2
(45) Date of Patent: Sep. 29, 2026

(54) TECHNIQUES FOR AUTOMATING RESILIENCE TESTING OF CLUSTERS IN A DISTRIBUTED COMPUTING ENVIRONMENT

(71) Applicant: NETFLIX, INC., Los Gatos, CA (US)

(72) Inventors: Sasha Elia Joseph, Campbell, CA (US); Annies Abduljaffar, San Jose, CA (US); Qasim Khawaja, Los Angeles, CA (US)

(73) Assignee: NETFLIX, INC., Los Gatos, CA (US)

( * ) Notice: Subject to any disclaimer, the term of this patent is extended or adjusted under 35 U.S.C. 154(b) by 17 days.

(21) Appl. No.: 19/041,809

(22) Filed: Jan. 30, 2025

(65) Prior Publication Data

US 2026/0222469 A1 Jul. 30, 2026

(51) Int. Cl.
*H04L 67/1008* (2022.01)
*H04L 41/5009* (2022.01)
*H04L 47/22* (2022.01)

(52) U.S. Cl.
CPC ...... *H04L 67/1008* (2013.01); *H04L 41/5012* (2013.01); *H04L 47/22* (2013.01)

(58) Field of Classification Search
CPC .. H04L 67/1006; H04L 41/5012; H04L 47/22
USPC .......................................................... 709/226
See application file for complete search history.

(56) References Cited

U.S. PATENT DOCUMENTS 7,370,101 B1 5/2008 Lakkapragada et al.
7,434,104 B1 10/2008 Skeoch et al.
9,065,783 B2 * 6/2015 Ding ..................... H04L 67/303
10,073,763 B1 9/2018 Raman et al.
10,346,367 B1 * 7/2019 Luszcz .................. G06F 16/182
10,866,851 B2 12/2020 Basiri et al.
11,361,846 B1 6/2022 Jain et al.
11,467,945 B1 10/2022 Cao et al.

(Continued)

FOREIGN PATENT DOCUMENTS

CN 101309167 B * 4/2011
CN 112671029 A * 4/2021

OTHER PUBLICATIONS

Non Final Office received for U.S. Appl. No. 19/041,806, dated Apr. 30, 2026, 10 pages.

(Continued)

*Primary Examiner* — Ruolei Zong
(74) *Attorney, Agent, or Firm* — Artegis Law Group, LLP

(57) ABSTRACT

One embodiment sets forth a technique for automatically identifying clusters within a network to be tested for resilience. The technique includes the steps of determining that a first condition precedent for testing a first cluster within the network for resilience has been satisfied; determining that the first cluster should be tested for resilience based on a first property associated with the first cluster; in response to determining that the first condition precedent has been satisfied and determining that the first cluster should be tested for resilience, generating a cluster resilience test package for the first cluster; automatically causing the first cluster to be tested under a cluster resilience test in accordance with the cluster resilience test package. Another embodiment sets forth techniques for automatically carrying out the cluster resilience test in accordance with the cluster resilience test package.

20 Claims, 8 Drawing Sheets

(56) References Cited

U.S. PATENT DOCUMENTS

| | | | |
|---|---|---|---|
| 11,757,982 B2* | 9/2023 | Nair .................... | H04L 67/1029 709/223 |
| 2006/0224725 A1* | 10/2006 | Bali .................... | H04L 67/1001 709/224 |
| 2008/0209044 A1 | 8/2008 | Forrester | |
| 2011/0145643 A1 | 6/2011 | Kumar et al. | |
| 2015/0134825 A1 | 5/2015 | Alshinnawi et al. | |
| 2017/0366604 A1* | 12/2017 | McDuff ................ | H04L 47/822 |
| 2019/0250954 A1* | 8/2019 | Sethi ................... | G06F 11/0793 |
| 2021/0073110 A1 | 3/2021 | Vidal et al. | |
| 2021/0203550 A1* | 7/2021 | Thakkar ................ | H04L 67/141 |
| 2022/0114041 A1 | 4/2022 | Tiwari et al. | |
| 2023/0409418 A1 | 12/2023 | Sood | |
| 2024/0286624 A1* | 8/2024 | Kaveri Poompatnam Chandrasekaran .... | G05B 23/00 |
| 2024/0291738 A1 | 8/2024 | Patronas et al. | |
| 2025/0147889 A1 | 5/2025 | Dayanand et al. | |
| 2025/0321869 A1 | 10/2025 | Bartram | |
| 2026/0050418 A1* | 2/2026 | Banerjee ................... | G06F 8/34 |

OTHER PUBLICATIONS

International Search Report for Application No. PCT/US2026/012730 dated Apr. 22, 2026.

International Search Report for Application No. PCT/US2026/012735 dated Apr. 23, 2026.

Cotroneo et al., "ThorFI: A Novel Approach for Network Fault Injection as a Service", arXiv:2201.07521, Jan. 19, 2022, pp. 1-21.

Burns et al., "Continuous Delivery with Spinnaker", Fast, Safe, Repeatable Multi-Cloud Deployments, May 11, 2018, 81 pages.

Rosenthal et al., "Chaos Engineering", System Resiliency in Practice, retrieved from https://www.oreilly.com/library/view/chaos-engineering/9781492043850/, Apr. 3, 2020, 372 pages.

Arundel et al., "Cloud Native DevOps with Kubernetes", Cloud Native DevOps with Kubernetes: Building, Deploying, and Scaling Modern Applications in the Cloud, Jan. 24, 2019, 344 pages.

* cited by examiner

TECHNIQUES FOR AUTOMATING RESILIENCE TESTING OF CLUSTERS IN A DISTRIBUTED COMPUTING ENVIRONMENT

BACKGROUND

Field of the Various Embodiments

Embodiments of the present disclosure relate generally to computer science and computer networks for streaming media, and more specifically, to techniques for automating resilience testing of clusters in a distributed computing environment.

Description of the Related Art

In distributed computing environments, services are typically supported by multiple clusters. Each cluster can include different computing resources, such as compute nodes, storage units, and network components that work together to manage and process workloads. The clusters that support a service must work in concert to ensure that the service meets performance and reliability requirements, particularly under conditions of varying or heightened load.

A significant technical challenge arises in the process of identifying the clusters that are critical to the operation of a service. Critical clusters are often intertwined with others through complex dependencies, where certain clusters may implement multiple services or be affected by external components. The dynamic nature of such dependencies adds further difficulty to identification processes, as service topologies can change frequently, both in response to evolving operational requirements and as a result of scaling activities. Conventional approaches for identifying critical clusters are largely manual, which can be both inefficient and prone to error. In particular, even minor oversights or misclassifications can lead to suboptimal resource allocation and service degradation when critical clusters are not correctly identified and monitored. For example, the criticality of a given cluster may be overlooked when attempting to identify critical clusters through manual approaches. As a result, if the cluster is unprepared to handle traffic spikes, then the cluster may fail under particular traffic scenarios, and may cause serious impact on other clusters that depend on the cluster.

Another technical challenge relates to testing the identified critical clusters under simulated load conditions to ensure the critical clusters can handle real-world network traffic spikes. In distributed computing environments, network traffic loads are rarely uniform, and services can experience sudden surges in network traffic that require dynamic responses from the underlying infrastructure to handle the surges. In this regard, manually generating and managing load tests requires a deep understanding of traffic patterns and operational demands, which can vary based on numerous factors such as time of day, geographic user distribution, and the nature of user interactions. Moreover, manually simulated load tests may not accurately capture the full spectrum of possible usage patterns, which can lead to incomplete assessments of the ability of a given cluster to handle stress. Accordingly, if load tests fail to account for all significant scenarios, the purportedly effective configurations derived from such tests can, in fact, be ineffective and result in subsequent misallocations of resources. For example, under-provisioning—which involves insufficiently allocating resources such as CPU, memory, or storage, to handle the workload demands—can cause cluster failures during peak loads. Conversely, over-provisioning can lead to the underutilization of active computational resources. In another example, a manually simulated load test may produce false positives, where the tested cluster passes the tested conditions but later fails in production due to an untested traffic spike scenario.

As the foregoing illustrates, what is needed in the art are more effective techniques for resilience testing of clusters in a distributed computing environment.

SUMMARY

One embodiment sets forth a computer-implemented method for automatically identifying clusters within a network to be tested for resilience. The method includes determining that a first condition precedent for testing a first cluster within the network for resilience has been satisfied. The method also includes determining that the first cluster should be tested for resilience based on a first property associated with the first cluster. The method also includes, in response to determining that the first condition precedent has been satisfied and determining that the first cluster should be tested for resilience, generating a cluster resilience test package for the first cluster. The method further includes automatically causing the first cluster to be tested under a cluster resilience test in accordance with the cluster resilience test package.

Another embodiment sets forth a computer-implemented method for automatically testing clusters within a network for resilience. The method includes receiving a cluster resilience test package associated with a cluster resilience test for a cluster. The method also includes establishing one or more configuration settings for the cluster based on the cluster resilience test package. The method also includes causing the cluster to implement the one or more configuration settings. The method also includes causing network traffic to be routed to the cluster based on one or more traffic shaping rules included in the cluster resilience test package. The method also includes analyzing telemetry information associated with the cluster to determine whether one or more performance goals included in the cluster resilience test package are satisfied. The method also includes, responsive to determining that the one or more performance goals are satisfied, causing at least one cluster to implement the one or more configuration settings. The method further includes, responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

Other embodiments of the present disclosure include, without limitation, one or more computer-readable media including instructions for performing one or more aspects of the disclosed techniques as well as a computing device for performing one or more aspects of the disclosed techniques.

One technical advantage of the disclosed techniques relative to the prior art is that the disclosed techniques streamline the process of determining and addressing potential weaknesses in a distributed computing environment. In particular, using the techniques disclosed herein, clusters that are critical to the operation of a service can be identified. Doing so eliminates the gaps and inconsistencies involved in manual testing approaches, where critical clusters are often difficult to identify, and, consequently, are overlooked and not tested for resilience. In turn, such clusters can be continuously and accurately tested under a wide range of simulated load conditions, to thereby ensure that relevant traffic patterns, usage spikes, and failure scenarios are accounted for. Doing so eliminates the gaps and inconsistencies involved in manual testing approaches, where incomplete or imprecise tests may lead to critical stress points being overlooked. The techniques disclosed herein can also be used to effectively identify optimal configurations for handling load spikes, thereby reducing the time and effort required to tune clusters for performance and reliability. Additionally, the automation techniques disclosed herein enable the efficient replication of such configurations across other clusters with built-in validation checks, which can be used to effect uniform application where appropriate. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 6 is a sequence diagram of interactions that take place between a control server, a traffic manager, and a cluster when automating resilience testing of clusters, according to various embodiments of.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
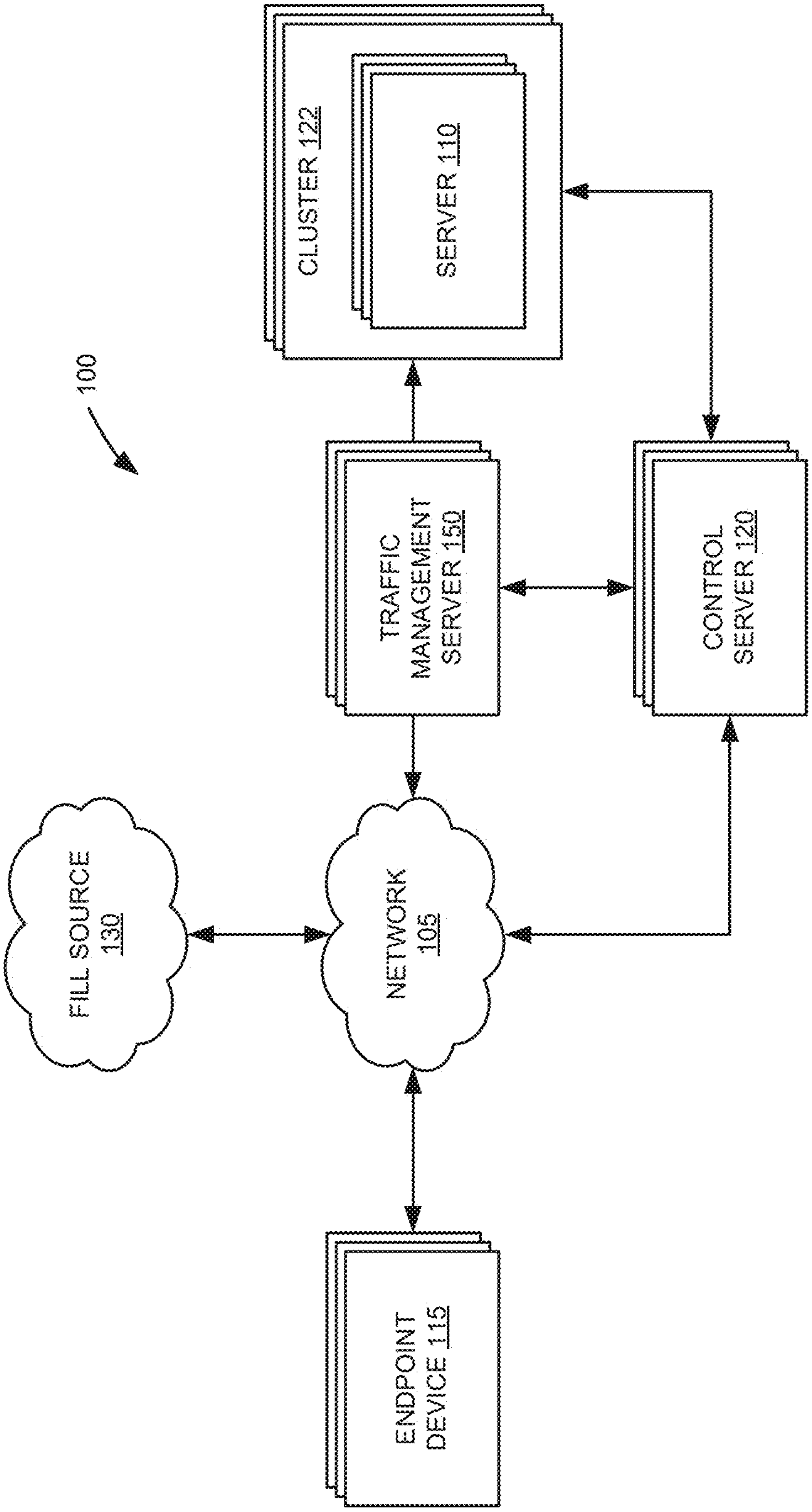
FIG. 1 illustrates a network infrastructure configured to implement one or more aspects of various embodiments.

FIG. 1 illustrates a network infrastructure 100 configured to implement one or more aspects of various embodiments. As shown, the network infrastructure 100 includes at least one control server 120, at least one server 110, at least one traffic management server 150, and at least one endpoint device 115, each of which are connected via a communications network 105. The communications network 105 can represent, for example, any technically feasible network or number of networks, including a wide area network (WAN) such as the Internet, a local area network (LAN), a Wi-Fi network, a cellular network, or a combination thereof.

As shown, one or more servers 110 can be logically included in a given cluster 122, which can be achieved by grouping the server(s) 110 under a common management system where the one or more servers 110 are configured to communicate with each other (e.g., over a communications network such as the communications network 105). Under such a configuration, the servers 110 can be configured to share resources and workload, thereby operating as a single abstracted system within the network infrastructure 100. This can be achieved through clustering software implemented by one or more control servers 120, which manage the distribution of tasks, synchronization operations, and redundancy operations across the servers 110 to implement load balancing, high availability, and fault tolerance techniques. In the interest of simplifying this disclosure, it should be appreciated that referring to a given cluster 122 can be interpreted as referring to one or more of the servers 110 logically included therein, and that referring to one or more of the servers 110 can be interpreted as referring to the cluster 122 in which the one or more servers 110 are logically included.

Each endpoint device 115 can communicate with one or more servers 110 (also referred to as "caches" or "nodes") via the communications network 105 to download content, such as textual data, graphical data, audio data, video data, and other types of data. The downloadable content can then be presented to a user of one or more endpoint devices 115. In various embodiments, the endpoint devices 115 can include computer systems, set top boxes, mobile computer, smartphones, tablets, console and handheld video game systems, digital video recorders (DVRs), DVD players, connected digital TVs, dedicated media streaming devices (e.g., a Roku® set-top box), and/or any other technically feasible computing platform that has network connectivity and is capable of presenting content, such as text, images, video, and/or audio content, to a user.

Each server 110 can include a web-server, database, and server manager 217 (described below in conjunction with FIG. 2) configured to communicate with the control server 120, other servers 110, etc., and to provide one or more functionalities. The functionalities can include, for example, streaming content, performing authentications, performing authorizations, performing discovery procedures, performing analytics procedures, and so on. For example, when a given server 110 functions as a content server, the server 110 can be configured to communicate with a fill source 130 to "fill" the server 110 with copies of various files. In addition, the servers 110 can respond to requests for files received from endpoint devices 115. The files can then be distributed from the servers 110 or via a broader content distribution network to the endpoint devices 115. In some embodiments, the servers 110 enable users to authenticate (e.g., using a username and password) in order to access files stored on the servers 110. It is noted that the foregoing examples are not meant to be limiting, and that the server 110 can provide any amount, type, form, etc., of operation(s), at any level of granularity, consistent with the scope of this disclosure.

In various embodiments, the fill source 130 can include an online storage service (e.g., Amazon® Simple Storage Service, Google® Cloud Storage, etc.) in which a catalog of files, including thousands or millions of files, is stored and accessed in order to fill the servers 110. The fill source 130 can also include a live content provider that delivers encoded video streams of live events to the control server 120. The live content can be transcoded, packaged, and distributed to the endpoint devices 115 via servers 110. Although only a single fill source 130 is shown in FIG. 1, in various embodiments, multiple fill sources 130 can be implemented to service requests for files. Further, as is well-understood, any number of cloud-based services can be included in the architecture of FIG. 1 beyond fill source 130 to the extent desired or necessary.

As described herein, the traffic management server 150 can be configured to orchestrate the manner in which traffic is routed to the clusters 122 so they can be tested for resilience under load spikes. For example, the control server 120 can provide instructions to the traffic management server 150 to cause the traffic management server 150 to modify configuration settings of a given cluster 122, the servers 110 logically included therein, other entities (e.g., load balancers), etc., to create spikes in traffic that are useful for effectively testing the resilience of the cluster 122.

Figure 2:
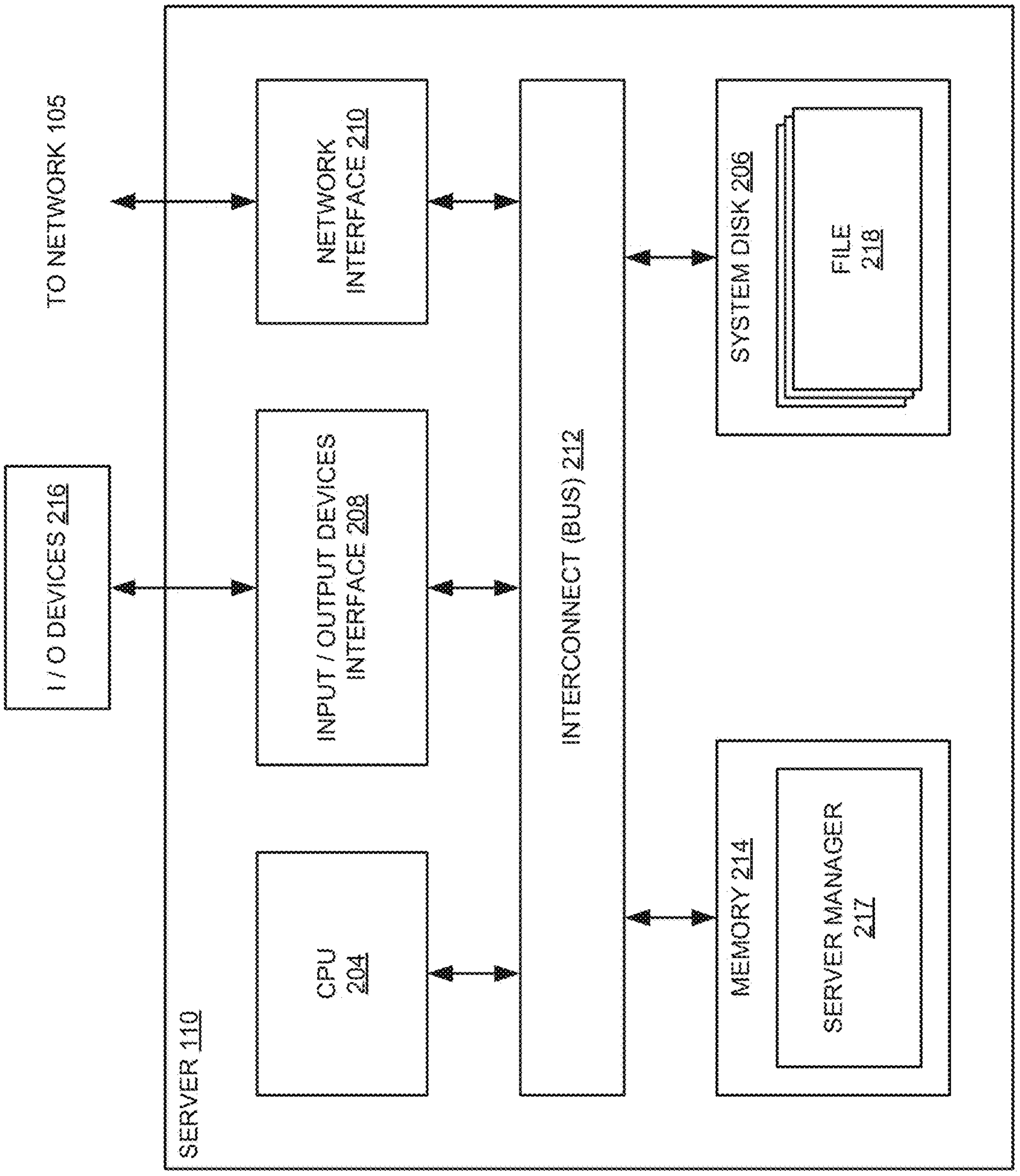
FIG. 2 is a more detailed illustration of a server of FIG. 1, according to various embodiments.

FIG. 2 is a more detailed illustration of a server 110 of FIG. 1, according to various embodiments. As shown, the server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server manager 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 can include one or more buttons, a keyboard, a mouse, and/or other input devices. The I/O devices interface 208 is further configured to receive output data from the CPU 204 via the interconnect 212 and transmit the output data to the I/O devices 216.

The system disk 206 can include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the communications network 105. In some embodiments, the network interface 210 is configured to operate in compliance with the Ethernet standard.

The system memory 214 includes a server manager 217 configured to service requests for files 218 received from endpoint device 115 and other servers 110. When the server manager 217 receives a request for a file 218, the server manager 217 retrieves the corresponding file 218 from the system disk 206 and transmits the file 218 to an endpoint device 115 or a server 110 via the communications network 105.

In a clustered environment, the server manager 217 on each server 110 can be responsible for executing various operations to ensure the server 110 effectively participates with other servers 110 in the cluster. In this regard, the server manager 217 can be configured to service and/or respond to requests, commands, etc., received from the control server 120, the traffic management server 150, associated with managing operating characteristics of the server 110 (and, by extension, the cluster 122 in which the server 110 is included). For example, the server manager 217 can perform tasks such as synchronizing data with other servers 110, balancing workloads (e.g., internally, with other servers 110, etc.), and managing resource allocation. The server manager 217 can also implement operations that ensure the server 110 is aware of its role within the cluster 122, maintain communication with other control servers 120, and contribute to collective tasks such as handling failovers, scaling resources, and the like. The server manager 217 can also monitor the health of the server 110, apply configuration updates, and coordinate state transitions, to ensure that the server 110 aligns with the overall performance, availability, and redundancy objectives of the cluster 122. It is noted that the foregoing examples are not meant to be limiting, and that the server manager 217 can be configured to implement any number, type, form, etc., of operation(s), at any level of granularity, to effectively manage the functionality of the server 110 both individually and collectively within the associated cluster 122, consistent with the scope of this disclosure.

Figure 3:
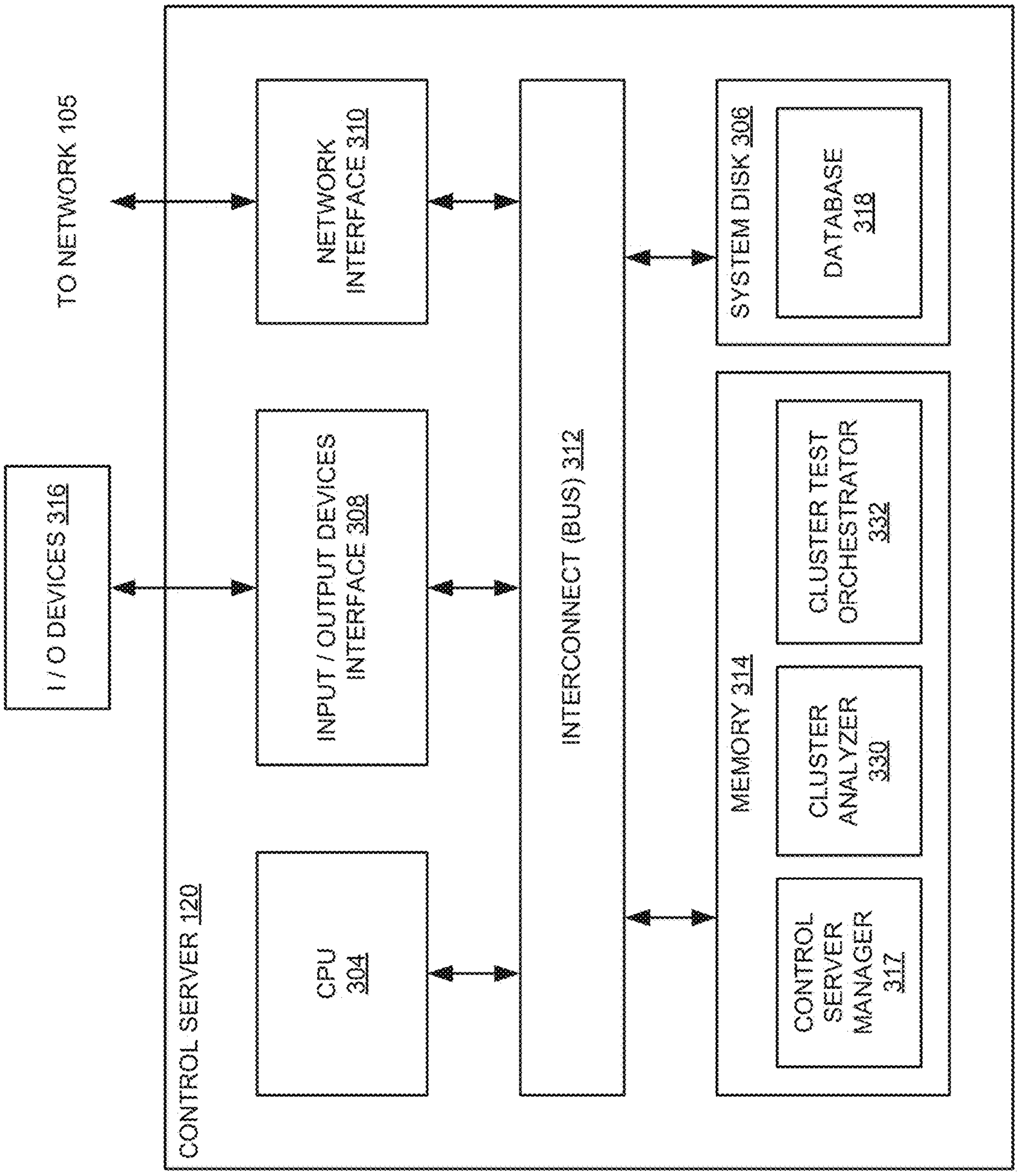
FIG. 3 is a more detailed illustration of a control server of FIG. 1, according to various embodiments.

FIG. 3 is a more detailed illustration of a control server 120 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control server manager 317, cluster analyzer 330, and cluster test orchestrator 332, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 can include one or more hard disk drives, solid state storage devices, and the like. The system disk 306 is configured to store a database 318 of information associated with the servers 110, the traffic management server 150, the fill source 130, the files 218, and so on.

The system memory 314 includes a control server manager 317 configured to access information stored in the database 318 and process the information to determine the manner in which specific files 218 will be replicated across servers 110 included in the network infrastructure 100. The control server manager 317 can further be configured to receive and analyze performance characteristics associated with one or more of the servers 110, clusters 122, endpoint devices 115, fill sources 130, etc., to determine how such entities should be configured, how traffic should flow between the entities, and so on, so that services provided by the network infrastructure 100 remain operational. For example, the control server manager 317 can receive, from the cluster test orchestrator 332 in conjunction with the cluster test orchestrator 332 carrying out cluster resilience tests, recommended configuration settings (e.g., for the organization of clusters 122, servers 110, etc.). In turn, the control server manager 317 can cause updated configuration settings to be applied to one or more entities included in the network infrastructure 100 (e.g., clusters 122, servers 110, etc.). It is noted that the foregoing examples are not meant to be limiting, and that the control server manager 317 can be configured to implement any number, type, form, etc., of operation(s), at any level of granularity, to effectively manage the operation of the network infrastructure 100, consistent with the scope of this disclosure.

The system memory 314 also includes a cluster analyzer 330, which can be configured to analyze different factors to automatically identify clusters 122 that are critical to the network infrastructure 100. For example, the cluster analyzer 330 can analyze a dependency graph that tracks relationships between servers 110, clusters 122, etc., to effectively identify clusters 122 that are responsible for providing core components or functions of the network infrastructure 100. In another example, the cluster analyzer 330 can analyze traffic loads to identify clusters 122 that are substantially responsible for handling requests received by the network infrastructure 100. In another example, the cluster analyzer 330 can analyze resource utilization, failure rates, recovery times, etc., to identify clusters that would significantly impact or have significantly impacted availability of the network infrastructure 100 during failure events. In yet another example, historical data on performance degradation during past outages, slowdowns, etc., can also be analyzed by the cluster analyzer 330 to identify clusters 122 that are essential for maintaining the overall integrity of the network infrastructure 100. It is noted that the foregoing examples are not meant to be limiting, and that the cluster analyzer 330 can be configured to implement any number, type, form, etc., of operation(s), at any level of granularity, to effectively identify clusters 122 that are critical to the operation of the network infrastructure 100, consistent with the scope of this disclosure.

The system memory 314 also includes a cluster test orchestrator 332, which can be configured to generate cluster resilience test packages for clusters 122 based on, for example, analyses, findings, etc., associated with the clusters 122 that are provided by the cluster analyzer 330. A cluster resilience test package for a cluster 122 can include, for example, cluster configuration settings that include a set of autoscaling rules, a set of load shedding rules, and so on, to be implemented by a cluster 122, the servers 110 included therein, etc., during the cluster resilience test. The cluster resilience test package can also include a set of traffic shaping rules to be applied against the cluster 122, which can be interpreted, applied, effected, etc., by the traffic management server 150. The cluster resilience test package can also include a set of performance goals that, when satisfied by the cluster 122, indicate the cluster 122 has passed the cluster resilience test. The cluster resilience test package can also be assigned a priority so that the cluster test orchestrator 332 performs the corresponding cluster resilience test in an appropriate order relative to other cluster resilience tests that have yet to be performed. It is noted that the foregoing examples are not meant to be limiting, and that the cluster resilience test package can include any amount, type, form, etc., of information, at any level of granularity, to enable the entities described herein to effectively test a cluster 122 for resilience, consistent with the scope of this disclosure.

As described herein, the cluster test orchestrator 332 can perform different operations to effectively carry out a cluster resilience test for a given cluster 122. For example, the cluster test orchestrator 332 can, as a preliminary operation, clone the cluster 122 to establish a cloned cluster 122 (e.g., by interfacing with the control server manager 317). In this manner, the cluster 122 can remain in operation and isolated from the cluster resilience test as it is being carried out. The cluster test orchestrator 332 can also provide the cluster resilience test package to the traffic management server 150 to cause the traffic management server 150 to perform different operations. The operations can include, for example, causing traffic to be routed to the cloned cluster 122 in accordance with the cluster resilience test package, providing traffic monitoring information to the cluster test orchestrator 332, and the like. In turn, the cluster test orchestrator 332 can analyze the traffic monitoring information to determine whether the set of performance goals included in the cluster resilience test package have been satisfied. If the cluster test orchestrator 332 determines that the set of performance goals have not been satisfied, then the cluster test orchestrator 332 can update the configuration settings of the cloned cluster 122 based on the traffic monitoring information and/or other relevant information, and repeat the testing described above using the updated configuration settings. Alternatively, if the cluster test orchestrator 332 determines that the set of performance goals have been satisfied, then the cluster test orchestrator 332 can perform different operations to conclude the cluster resilience test. The operations can include, for example, causing the traffic management server 150 to wind down the changes caused by the traffic shaping rules included in the cluster resilience test package, shutting down the cloned cluster 122, providing recommended configuration settings to the control server manager 317, and the like. It is noted that the foregoing examples are not meant to be limiting, and that the cluster test orchestrator 332 can be configured to implement any number, type, form, etc., of operation(s), at any level of granularity, to effectively carry out cluster resilience tests, consistent with the scope of this disclosure.

Figure 4:
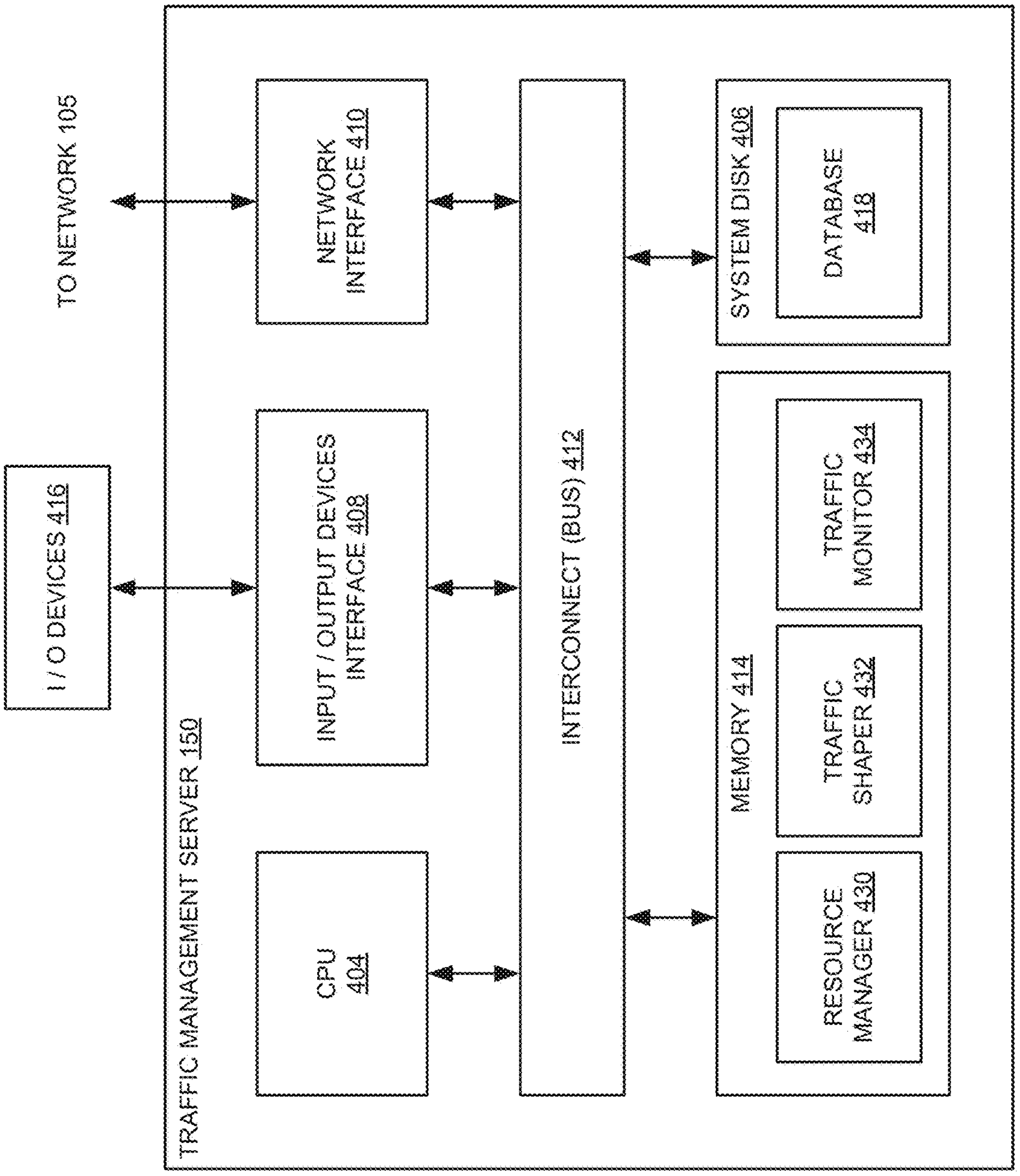
FIG. 4 is a more detailed illustration of a traffic management of FIG. 1, according to various embodiments.

FIG. 4 is a more detailed illustration of a traffic management server 150 of FIG. 1, according to various embodiments. As shown, the traffic management server 150 includes, without limitation, a central processing unit (CPU) 404, a system disk 406, an input/output (I/O) devices interface 408, a network interface 410, an interconnect 412, and a system memory 414.

The CPU 404 is configured to retrieve and execute programming instructions, such as resource manager 430, traffic shaper 432, and traffic monitor 434, stored in the system memory 314. Similarly, the CPU 404 is configured to store application data (e.g., software libraries) and retrieve application data from the system memory 414 and a database 418 stored in the system disk 406. The interconnect 412 is configured to facilitate transmission of data between the CPU 404, the system disk 406, I/O devices interface 408, the network interface 410, and the system memory 414. The I/O devices interface 408 is configured to transmit input data and output data between the I/O devices 416 and the CPU 404 via the interconnect 412. The system disk 406 can include one or more hard disk drives, solid state storage devices, and the like. The system disk 406 is configured to store a database 418 of information associated with the control server 120, the servers 110, and the endpoint devices 115.

The system memory 414 includes a resource manager 430 configured to perform a variety of traffic routing operations for the network infrastructure 100. For example, the resource manager 430 can distribute incoming requests, or cause incoming requests to be distributed (e.g., by way of one or more load balancing entities), across the clusters 122 based on factors such as load, availability, and resource utilization. The resource manager 430 can interface with a traffic monitor 434 that monitors the health and performance of each cluster 122 in real time. In this manner, the resource manager 430 can ensure that traffic is directed in a manner that prevents overloading, minimizes latency, and so on. Additionally, when cluster 222 failures are detected, the resource manager 430 can automatically reroute traffic to available alternative clusters 122, thereby providing failover functionality to maintain service continuity. Additionally, the resource manager 430 can enforce traffic policies, such as prioritizing certain types of requests, clients, etc., and can apply security measures, such as inspecting incoming traffic to detect and block potential threats. It is noted that the foregoing examples are not meant to be limiting, and that the resource manager 430 can be configured to implement any number, type, form, etc., of operation(s), at any level of granularity, to effectively manage traffic flow associated with the network infrastructure 100, consistent with the scope of this disclosure.

The system memory 414 also includes a traffic shaper 432 configured to route traffic to a given cluster 122 in a manner that is useful for testing the resilience of the cluster 122. In particular, the traffic shaper 432 can be configured to receive, from the cluster test orchestrator 332, a cluster resilience test package for a particular cluster 122, where, as described herein, the cluster resilience test package includes a set of traffic shaping rules to be applied against the cluster 122. In turn, the traffic shaper 432 can cause traffic to be routed to the cluster 122 consistent with the traffic shaping rules so that the cluster resilience test can be carried out.

Figure 5:
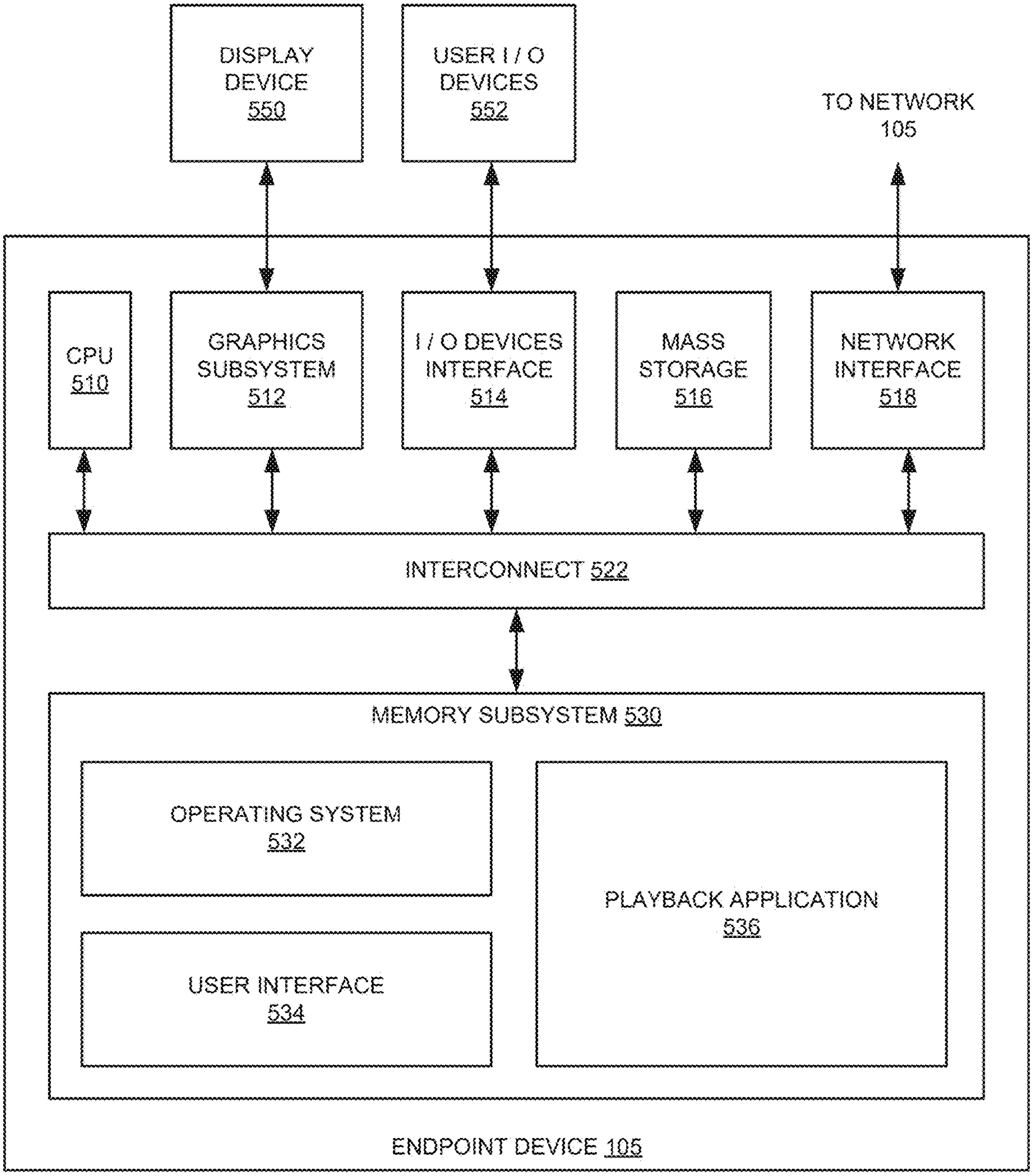
FIG. 5 is a more detailed illustration of an endpoint device of FIG. 1, according to various embodiments.

FIG. 5 is a more detailed illustration of an endpoint device of FIG. 1, according to various embodiments. As shown, the endpoint device 115 can include, without limitation, a CPU 510, a graphics subsystem 512, an I/O device interface 514, a mass storage unit 516, a network interface 518, an interconnect 522, and a memory subsystem 530.

In some embodiments, the CPU 510 is configured to retrieve and execute programming instructions stored in the memory subsystem 530. Similarly, the CPU 510 is configured to store and retrieve application data (e.g., software libraries) residing in the memory subsystem 530. The interconnect 522 is configured to facilitate transmission of data, such as programming instructions and application data, between the CPU 510, graphics subsystem 512, I/O devices interface 514, mass storage 516, network interface 518, and memory subsystem 530.

In some embodiments, the graphics subsystem 512 is configured to generate frames of video data and transmit the frames of video data to display device 550. In some embodiments, the graphics subsystem 512 can be integrated into an integrated circuit, along with the CPU 510. The display device 550 can comprise any technically feasible means for generating an image for display. For example, the display device 550 can be fabricated using liquid crystal display (LCD) technology, cathode-ray technology, and light-emitting diode (LED) display technology. An input/output (I/O) device interface 514 is configured to receive input data from user I/O devices 552 and transmit the input data to the CPU 510 via the interconnect 522. For example, user I/O devices 552 can comprise one of more buttons, a keyboard, and a mouse or other pointing device. The I/O device interface 514 also includes an audio output unit configured to generate an electrical audio output signal. User I/O devices 552 includes a speaker configured to generate an acoustic output in response to the electrical audio output signal. In alternative embodiments, the display device 550 can include the speaker. A television is an example of a device known in the art that can display video frames and generate an acoustic output.

A mass storage unit 516, such as a hard disk drive or flash memory storage drive, is configured to store non-volatile data. A network interface 518 is configured to transmit and receive packets of data via the communications network 105. In some embodiments, the network interface 518 is configured to communicate using the well-known Ethernet standard. The network interface 518 is coupled to the CPU 510 via the interconnect 522.

In some embodiments, the memory subsystem 530 includes programming instructions and application data that comprise an operating system 532, a user interface 534, and a playback application 536. The operating system 532 performs system management functions such as managing hardware devices including the network interface 518, mass storage unit 516, I/O device interface 514, and graphics subsystem 512. The operating system 532 also provides process and memory management models for the user interface 534 and the playback application 536. The user interface 534, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 536 is configured to request and receive content from the server 110 via the network interface 518. Further, the playback application 536 is configured to interpret the content and present the content via display device 550 and/or user I/O devices 552.

It will be appreciated that the server 110, the control server 120, the traffic management server 150, and the endpoint device 115 described above in conjunction with FIGS. 2-5 are illustrative, and that variations and modifications are possible. The connection topologies, including the number of CPUs and memories, may be modified as desired, and, in certain embodiments, one or more components shown in FIGS. 2-5 may not be present. Further, in certain embodiments, one or more components shown in FIGS. 2-5 may be implemented as virtualized resources in a virtual computing environment and/or a cloud computing environment.

Automated Resilience Testing of Clusters

Figure 6:
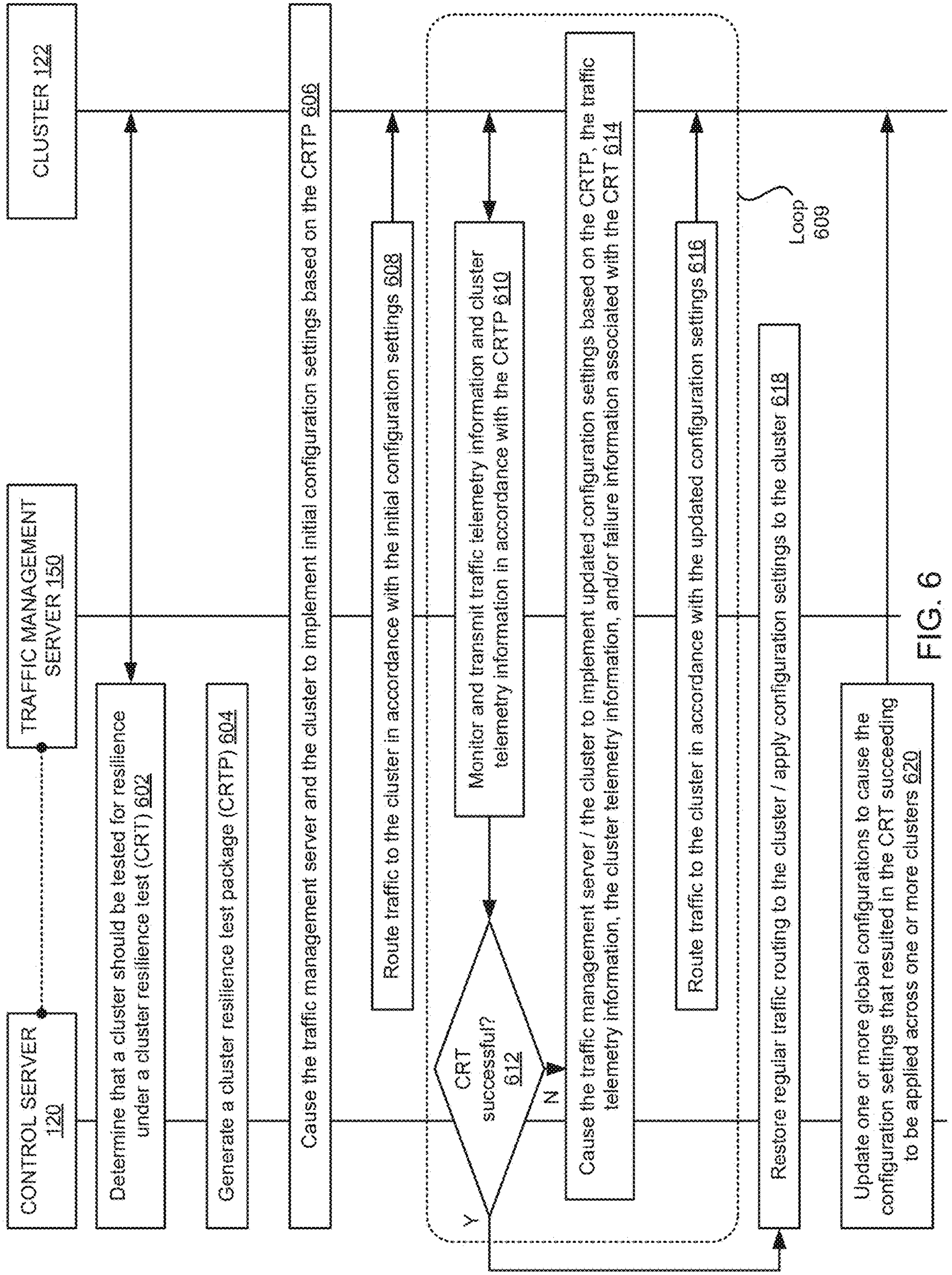

FIG. 6 is a sequence diagram of interactions that can take place between the control server 120, the traffic manager 150, and the cluster 122 when automating resilience testing of clusters, according to various embodiments. Although the steps of FIG. 6 are described with reference to the systems of FIGS. 1-5, persons skilled in the art will understand that any system configured to implement the method steps, in any order, falls within the scope of the present disclosure.

As shown in FIG. 6, the sequence diagram begins at step 602, where the control server 120 determines that a cluster 122 should be tested for resilience under a cluster resilience test. Such a determination can be made, for example, in conjunction with identifying that one or more conditions are satisfied. In one example, a condition is satisfied when the cluster 122 is new within the network infrastructure 100. In another example, a condition is satisfied when a configuration update was recently made to the cluster 122, one or more other clusters 122 on which the cluster 122 depends, and/or the network infrastructure 100. In another example, a condition is satisfied when a threshold amount of time lapses relative to a last time, if any, that the cluster 122 was tested for resilience. In another example, a condition is satisfied when the cluster 122 is scheduled to be involved in servicing a live streaming event that is projected to bring a threshold level of traffic to the network infrastructure 100. In another example, a condition is satisfied when the cluster 122 is scheduled to be involved in servicing an on-demand event that is projected to bring a threshold level of traffic to the network infrastructure 100. In another example, a condition is satisfied when one or more changes to average traffic patterns associated with the cluster 122 have been observed. In yet another example, a condition is satisfied when at least one failure event has been observed in the operation of the cluster 122 within a threshold period of time. It is noted that the foregoing examples are not meant to be limiting, and that the control server 120 can analyze any amount, type, form, etc., of information, at any level of granularity, to effectively identify when a given cluster 122 should be tested for resilience, consistent with the scope of this disclosure.

At step 604, the control server 120 generates a cluster resilience test package for the cluster resilience test. The cluster resilience test package can be based on, for example, any of the conditions associated with determining that the cluster 122 should be tested for resilience (e.g., as described above in conjunction with step 602). The cluster resilience test package can also be based on hardware/software properties associated with the servers 110 included in the cluster 122. Such properties can include, for example, a number of servers 110 included in the cluster 122, a number of virtual machines implemented within the cluster 122, a region (e.g., a geographic region, a virtual region, etc.) associated with the cluster 122, at least one property of an upcoming live event to be streamed by the cluster 122, at least one property of an upcoming on-demand event to be streamed by the cluster 122, at least one change made to an operational configuration of the cluster 122 within a threshold period of time, and the like. The cluster resilience test package can also be based on traffic patterns (e.g., historical, current, anticipated, etc.) associated with the cluster 122. It is noted that the foregoing examples are not meant to be limiting, and that the control server 120 can generate the cluster resilience test package based on any amount, type, form, etc., of information, at any level of granularity, consistent with the scope of this disclosure.

According to some embodiments, the cluster resilience test package can include a set of traffic shaping rules to be applied (e.g., by the traffic management server 150) against the cluster 122 during the cluster resilience test. The cluster resilience test package can also include configuration settings that define a set of autoscaling rules to be implemented by the cluster 122 and/or a set of load shedding rules to be implemented by the cluster 122 during the cluster resilience test. The cluster resilience test package can further include a set of performance goals that, when satisfied by the cluster 122, indicate the cluster 122 has passed the cluster resilience test. It is noted that the foregoing examples are not meant to be limiting, and that the cluster resilience test package can include any amount, type, form, etc., of information, at any level of granularity, consistent with the scope of this disclosure.

As a brief aside, the set of autoscaling rules can define, for example, the operational readiness—commonly referred to as the "warmness"—of a cluster 122, which can be based on a variety of factors (e.g., data cache pre-population configurations, session persistence configurations, service routing configurations, connection pooling configurations, preemptive health check configurations, etc.). The set of autoscaling rules can also define, for example, thresholds for CPU, memory, request throughput, or network utilization to trigger scaling actions. In particular, the set of autoscaling rules can define when to add resources to handle increased load or scale down to reduce costs during low usage periods. The set of autoscaling rules may also include time-based rules to preemptively scale for predictable workloads and cooldown periods to avoid excessive scaling. The set of autoscaling rules may also include limits on minimum and maximum instance counts to ensure the cluster 122 remains responsive without overprovisioning resources. Additionally, the set of load shedding rules can define thresholds for CPU, latency, memory, network utilization, etc., utilization, beyond which incoming requests are prioritized or dropped to maintain performance and stability. The set of load shedding rules can also be used to classify and drop non-critical requests, to throttle specific workloads during high-stress periods, to disable retries for certain types of requests, etc., while preserving capacity for high-priority processes. The set of load shedding rules can also be used to incorporate escalation levels, activating progressively stricter limits as utilization rises, and may also include cooldown periods to gradually reallow requests as resources become available. It is noted that the foregoing examples are not meant to be limiting, and that the set of autoscaling rules and the set of load shedding rules can include any amount, type, form, etc., of information, at any level of granularity, consistent with the scope of this disclosure.

At step 606, the control server 120 causes the traffic management server 150 and the cluster 122 to implement initial configuration settings based on the cluster resilience test package. In particular, the control server 120 can provide the set of traffic shaping rules to the traffic management server 150 to cause the traffic management server 150 to begin routing traffic to the cluster 122 (in a manner consistent with the set of traffic shaping rules) so the cluster resilience test can begin. The control server 120 can also cause the set of autoscaling rules and/or the set of load shedding rules to be applied to the cluster 122. For example, the control server manager 317 on the control server 120 can communicate with server managers 217 executing on servers 110 (included in the cluster 122) to cause the servers 110 (and, by extension, the cluster 122) to operate in accordance with the set of load shedding rules and the set of autoscaling rules.

At step 608, the traffic management server 150 routes traffic to the cluster 122 in accordance with the initial configuration settings. In particular, the traffic management server 150 can direct an increased share of traffic to the cluster 122, by managing the traffic directly, and/or by coordinating with load balancers included in the network infrastructure 100. For example, the traffic management server 150 can dynamically reroute a specific percentage of traffic, or select certain types of requests in the traffic, to the cluster 122. The traffic manager can also leverage priority-based, weight-based, etc., routing rules, and adjust them in real time to simulate peak traffic conditions against the cluster 122. It is noted that the foregoing examples are not meant to be limiting, and that the traffic management server 150 can use any number, type, form, etc., of approach(es), at any level of granularity, to effectively route traffic to the cluster 122, consistent with the scope of this disclosure.

At step 610, the traffic management server 150 monitors the network infrastructure 100 to generate traffic telemetry information and cluster telemetry information in accordance with the cluster resilience test package, and provides the traffic telemetry information and the cluster telemetry information to the control server 120 for analysis. According to some embodiments, the traffic management server 150 can query different entities within the network infrastructure 100 for information, cause the different entities to provide (i.e., push) information to the traffic management server 150, and so on. The information can be pre-processed into a particular form by the entities to reduce the amount of processing that is performed by the traffic management server 150 when generating the traffic and cluster telemetry information. The traffic management server 150 can optionally process the traffic and/or cluster telemetry information prior to providing it to the control server 120. It is noted that the foregoing examples are not meant to be limiting, and that the traffic management server 150 (and/or other entities included in and/or external to the network infrastructure 100) can carry out any number, type, form, etc., of operation(s), at any level of granularity, to effectively gather, generate, etc., the traffic telemetry information, the cluster telemetry, and/or other telemetry information that is relevant to the cluster resilience test, consistent with the scope of this disclosure.

According to some embodiments, the traffic telemetry information can include key metrics that reveal how the cluster 122 is handling traffic under load. The metrics can include, for example, request throughput, which captures the volume and rate of incoming and processed requests to understand handling capacity. The metrics can also include latency, which measures the time taken to fulfill requests. The metrics can additionally include error rates, which can be used to track failed or dropped requests. The metrics can additionally include queue lengths and response time distribution, which can provide insight into any delays in processing requests. The metrics can additionally include retry attempts, which can be used to identify instances where endpoint devices 115 are experiencing degraded service. It is noted that the foregoing examples are not meant to be limiting, and that the traffic telemetry information can include any amount, type, form, etc., of information, at any level of granularity, consistent with the scope of this disclosure.

According to some embodiments, the cluster telemetry information can include hardware and software metrics associated with the cluster 122, the servers 110 included in the cluster 122, etc., that provide insights into how effectively the underlying infrastructure is supporting the increased demand. For example, the metrics can include CPU utilization, memory usage, and disk I/O rates, which can indicate overall stress levels being experienced by the cluster 122/the servers 110. The metrics can also include power consumption and thermal readings, which can also indicate overall stress levels being experienced by the cluster 122/the servers 110. The metrics can also include network interface information, such as packet loss, throughput, and error rates, which can indicate stability and capacity (or lack thereof) to handle high traffic volumes. The metrics can also include garbage collection frequency and duration, thread pool utilization, and database connection counts, which can be used to identify stress points within application stacks. It is noted that the foregoing examples are not meant to be limiting, and that the cluster telemetry information can include any amount, type, form, etc., of information, at any level of granularity, consistent with the scope of this disclosure.

At step 612—which, as shown, is a first step of a loop 609—the control server 120 determines, based on the traffic telemetry information and the cluster telemetry information, whether the cluster resilience test is successful. According to some embodiments, the set of performance goals can relate to a success buffer associated with a first amount of additional load that can be handled by the cluster 122 before service degradation occurs. The set of performance goals can also relate to a failure buffer associated with a second amount of additional load that can be handled by the cluster 122 before service failure occurs. The set of performance goals can further relate to a recovery time constant that represents an amount of time required for the success buffer to recover relative to an occurrence of a load spike experienced by the cluster 122 by autoscaling. In this regard, the control server 120 can analyze the telemetry information to determine whether the success buffer was exceeded and/or whether the failure buffer was exceeded, which both constitute undesirable operating states for the cluster 122. The control server 120 can also analyze the telemetry information to determine whether the observed recovery time constant reached undesirable levels. It is noted that the foregoing examples are not meant to be limiting, and that the set of performance goals can include any amount, type, form, etc., of goal(s), at any level of granularity, to effectively structure the cluster resilience test, and to effectively enable the control server 120 to determine whether the cluster 122 passed or failed the cluster resilience test, consistent with the scope of this disclosure.

If, at step 612, control server 120 determines that the cluster resilience test is successful (i.e., the cluster 122 has passed the cluster resilience test), then the method 600 proceeds to step 618, which is described below in detail. Otherwise, the method 600 proceeds to step 614. As an aside, it should be appreciated that the control server 120 can maintain a counter associated with a number of times the loop 609 executes so that the cluster resilience test can be aborted when configuration settings effective for passing the cluster resilience test cannot be determined within a reasonable number of iterations of the loop 609. Alternatively, or additionally, the control server 120 can maintain a timer associated with a cumulative amount of time the loop 609 executes so that the cluster resilience test can be aborted when configuration settings effective for passing the cluster resilience test cannot be determined within a reasonable amount of time. Alternatively, or additionally, the control server 120 can determine when a fixed number of different configuration settings to be applied via the cluster resilience test have been applied throughout the cluster resilience test, but have failed to yield a passing condition. Other approaches can also be utilized to ensure the cluster resilience test is carried out efficiently and in within a reasonable period of time.

As described above, step 614 is carried out by the control server 120 when the control server 120 has determined that the cluster resilience test is unsuccessful (i.e., the cluster 122 has failed the cluster resilience test). To address this issue, at step 614, the control server 120 causes the traffic management server 150 and/or the cluster 122 to implement updated configuration settings based on the cluster resilience test package, the traffic telemetry information, the cluster telemetry information, and/or failure information (e.g., determined, generated, etc., by the control server 120 at step 612) associated with the cluster resilience test.

The updated configuration settings can be applied to the cluster 122, and, at step 616, the traffic management server 150 routes traffic to the cluster 122 in accordance with the updated configuration settings. In turn, the control server 120 re-tests the cluster 122 at steps 610 and 612 to determine whether cluster 122 passes the cluster resilience test under the updated configuration settings. This process can be repeated until updated configuration settings effective for passing the cluster resilience test are identified, until one or more thresholds, predefined quantities, etc., (e.g., a number of tests, an amount of time, etc.) are satisfied, and/or the like.

When generating updated configuration settings for the cluster 122, a first aspect to assess can be the current set of autoscaling rules for the cluster 122. The set of autoscaling rules can include, for example, minimum and maximum thresholds for node instances (e.g., servers 110 included in the cluster 122, virtual machines operating within the cluster 122, etc.), CPU and memory utilization targets, and response times for scaling up or down. If the cluster 122 cannot scale efficiently under heavier traffic, then the CPU and memory utilization targets can be adjusted to allow the cluster 122 to add nodes preemptively when the load is still within manageable limits (e.g., within the success buffer described herein). Increasing the maximum node count(s) is another adjustment that can provide additional resources, especially in cases where the existing limit is too low to meet the traffic demands under the cluster resilience test. However, an increase in nodes must be balanced with cost and overhead considerations, as excessive scaling may lead to diminishing returns, resource wastage, and the like. Another area for tuning lies in the areas of cooldown periods and threshold limits. In particular, if nodes are being added or removed too slowly, then reducing the cooldown period may establish resilience against intermittent traffic spikes. Additionally, lowering different metric thresholds that trigger scaling can help the cluster 122 respond at a lower level of resource usage, thereby allowing the cluster to stay ahead of the traffic before it reaches critical load. For example, decreasing the CPU utilization threshold for scaling up will prompt the cluster 122 to add nodes when traffic begins to rise, thereby improving the ability of the cluster 122 to manage the incoming requests. It is noted that the foregoing examples are not meant to be limiting, and that the set of autoscaling rules can be modified based on any amount, type, form, etc., of information, at any level of granularity, consistent with the scope of this disclosure.

When generating updated configuration settings for the cluster 122, another aspect to assess can be the current set of load shedding rules. The set of load shedding rules can include, for example, limits on request handling, e.g., by rate-limiting certain types of requests, by deprioritizing less critical traffic, and the like. Tightening such limits may allow the cluster 122 to offload non-critical requests more aggressively, which can help ensure that only the most essential traffic reaches the nodes within the cluster 122. The control server 120 can also analyze the types of traffic and requests being routed to the cluster 122 to understand whether certain operations can be deprioritized or routed differently. For example, reducing or capping requests for compute-intensive tasks may relieve pressure on the cluster 122. This can involve defining more granular thresholds for shedding based on the resource intensity of different request types, which can help prevent any single type of request from monopolizing resources relative to the cluster 122. Additionally, the set of load shedding rules can be adjusted to redirect traffic to auxiliary clusters 122, to temporarily cache requests for later processing in order to achieve an acceptable level of service availability, and the like. It is noted that the foregoing examples are not meant to be limiting, and that the set of load shedding rules can be modified based on any amount, type, form, etc., of information, at any level of granularity, consistent with the scope of this disclosure.

In addition to—or, as an alternative to—adjusting the configuration settings for the cluster 122, the control server 120 can adjust the current set of traffic shaping rules implemented by the traffic management server 150 for the cluster resilience test. In one example, the level of traffic can be gradually reduced (e.g., while keeping the current sets of autoscaling and load-shedding rules constant), to enable the control server 120 to identify a traffic level where the cluster 122 stabilizes and passes the cluster resilience test. In this regard, it should be appreciated that when the cluster 122 passes the cluster resilience test without difficulty, the level of traffic can be gradually increased (e.g., while keeping the autoscaling and load shedding rules constant), to identify a traffic level under which the cluster 122 operates desirably while remaining capable of passing the cluster resilience test. It is noted that the foregoing examples are not meant to be limiting, and that the traffic rules can be modified based on any amount, type, form, etc., of information, at any level of granularity, consistent with the scope of this disclosure.

As a brief aside, it should be appreciated that various approaches can be utilized to iteratively adjust the different configuration settings for the cluster 122/traffic management server 150 each time the cluster 122 fails the cluster resilience test under the current configuration settings. For example, adjustments to the current set of load shedding rules can be performed before adjustments are made to the current set of autoscaling rules, and adjustments to the current set of autoscaling rules can be performed before adjustments are made to the current set of traffic shaping rules. Moreover, adjustments to the load shedding rules, the autoscaling rules, and/or the traffic shaping rules can be performed in orders that are least impactful to most impactful with respect to the level of changes that are being effected, the severity of the results that the changes yield, and so on. It is noted that the foregoing examples are not meant to be limiting, and that one or more of the different sets of rules can be adjusted in accordance with any amount, type, form, etc., of priority/priorities—whether individually or concurrently with each failed cluster resilience test—at any level of granularity, consistent with the scope of this disclosure.

At step 618—which, as described above, is carried out when the control server 120 determines at step 612 that the cluster resilience test is successful—the control server 120 restores normal traffic routing to the cluster 122 (e.g., by providing instructions to the traffic management server 150 that cause the traffic routing procedures associated with the cluster resilience test to be rolled back). The control server 120 can also apply configuration settings to the cluster 122, e, original configuration settings implemented by the cluster 122 prior to the cluster resilience test, optimized configuration settings that resulted in the cluster 122 passing the cluster resilience test, or different configuration settings (e.g., configuration settings derived from the original configuration settings, the optimized configuration settings, and/or other configuration settings).

At step 620, the control server 120 updates one or more global configurations to cause the configuration settings that resulted in the cluster 122 passing the cluster resilience test to be applied across one or more clusters 122. In particular, when configuration settings have been identified for the cluster 122 to pass the cluster resilience test, the configuration settings can be propagated to similar clusters 122, where appropriate, across the network infrastructure 100. A first step in this process can include identifying clusters 122 that have the same or similar characteristics to the cluster 122 and would therefore benefit from adopting the same or similar configuration settings. Typically, clusters 122 can be grouped based on workload type, traffic patterns, resource dependencies, and the types of requests they handle. By analyzing such factors, the control server 120 can identify clusters 122 that are likely to experience similar demand peaks, compute loads, and operational requirements, thereby making those clusters 122 ideal candidates for inheriting the configuration settings.

In addition to identifying clusters 122 with similar workloads, the control server 120 can evaluate infrastructure similarities, such as resource allocation and hardware specifications between the cluster 122 and other clusters 122 in the network infrastructure 100. In one example, clusters 122 running similar nodes, with equivalent memory and CPU resources, are more likely to respond effectively to the same autoscaling and load-shedding configuration settings. In another example, clusters 122 operating within the same region or under similar network conditions may benefit from parallel adjustments, where latency and network capacity play important roles in load management. Grouping clusters 122 based on such similarities reduces the risk of overloading a cluster 122 with inappropriate configuration settings, which can help ensure that the newly applied configuration settings yield the intended resilience benefits.

Figure 7:
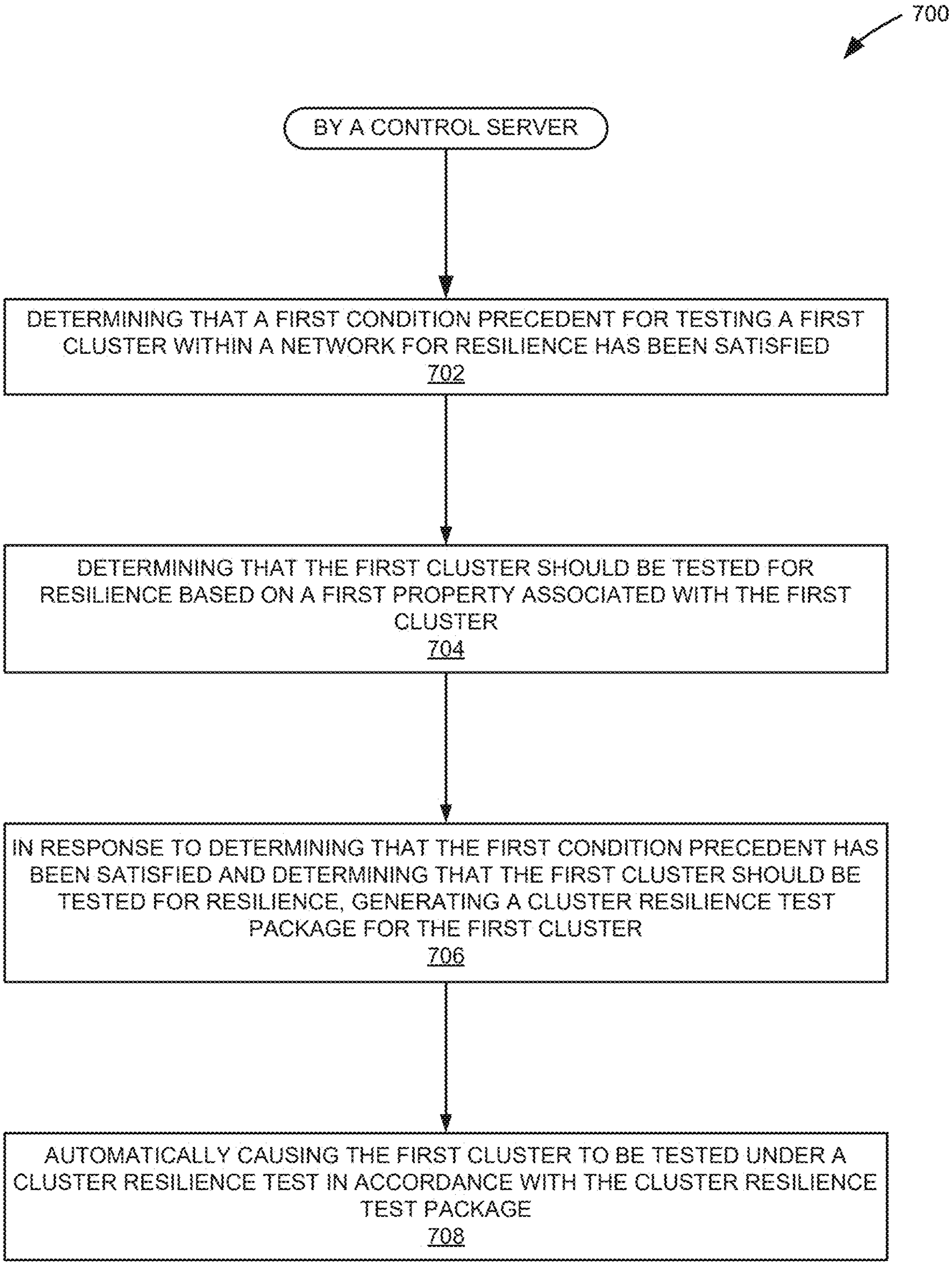
FIG. 7 illustrates a method for automatically identifying clusters within a network to be tested for resilience, according to various embodiments.

When the one or more clusters 122 have been identified, the next aspect to consider is scheduling when updates will be made to the clusters 122. In particular, rolling out such changes during periods of low activity is typically ideal, as it minimizes disruption and allows for monitoring with minimal impact on end users. This approach enables configuration updates to be applied sequentially, and can allow for the control server 120 to gauge the effectiveness of the configuration settings on a subset of the clusters 122 before carrying out a complete rollout. Additionally, a phased rollout approach—where configurations are applied incrementally to a subset of similar clusters—can provide a controlled environment to monitor for unintended issues. This approach can allow for the control server 120 to make adjustments in real-time based on early telemetry information, which can help reduce the potential risks associated with widespread changes. Accordingly, by carefully selecting similar clusters 122 and optimal rollout times, the control server 120 can effectively extend resilience improvements across the network infrastructure 100 in an optimized manner. It is noted that the foregoing examples are not meant to be limiting, and that the control server 120 can implement any number, type, form, etc., of operation(s), at any level of granularity, to effectively roll out configuration settings to the clusters 122, consistent with the scope of this disclosure FIG. 7 illustrates a method 700 for automatically identifying clusters within a network to be tested for resilience, according to various embodiments. Although the method steps are described with reference to the systems of FIGS. 1-5, persons skilled in the art will understand that any system configured to implement the method steps, in any order, falls within the scope of the present disclosure.

As shown, a method 700 begins at step 702, where the control server 120 determines that a first condition precedent for testing a first cluster within a network for resilience has been satisfied (e.g., as described above in conjunction with FIGS. 1-6).

At step 704, the control server 120 determines that the first cluster should be tested for resilience based on a first property associated with the first cluster (e.g., as described above in conjunction with FIGS. 1-6).

At step 706, the control server 120, in response to determining that the first condition precedent has been satisfied and determining that the first cluster should be tested for resilience, generates a cluster resilience test package for the first cluster (e.g., as described above in conjunction with FIGS. 1-6).

At step 708, the control server 120 automatically causes the first cluster to be tested under a cluster resilience test in accordance with the cluster resilience test package (e.g., as described above in conjunction with FIGS. 1-6).

Figure 8:
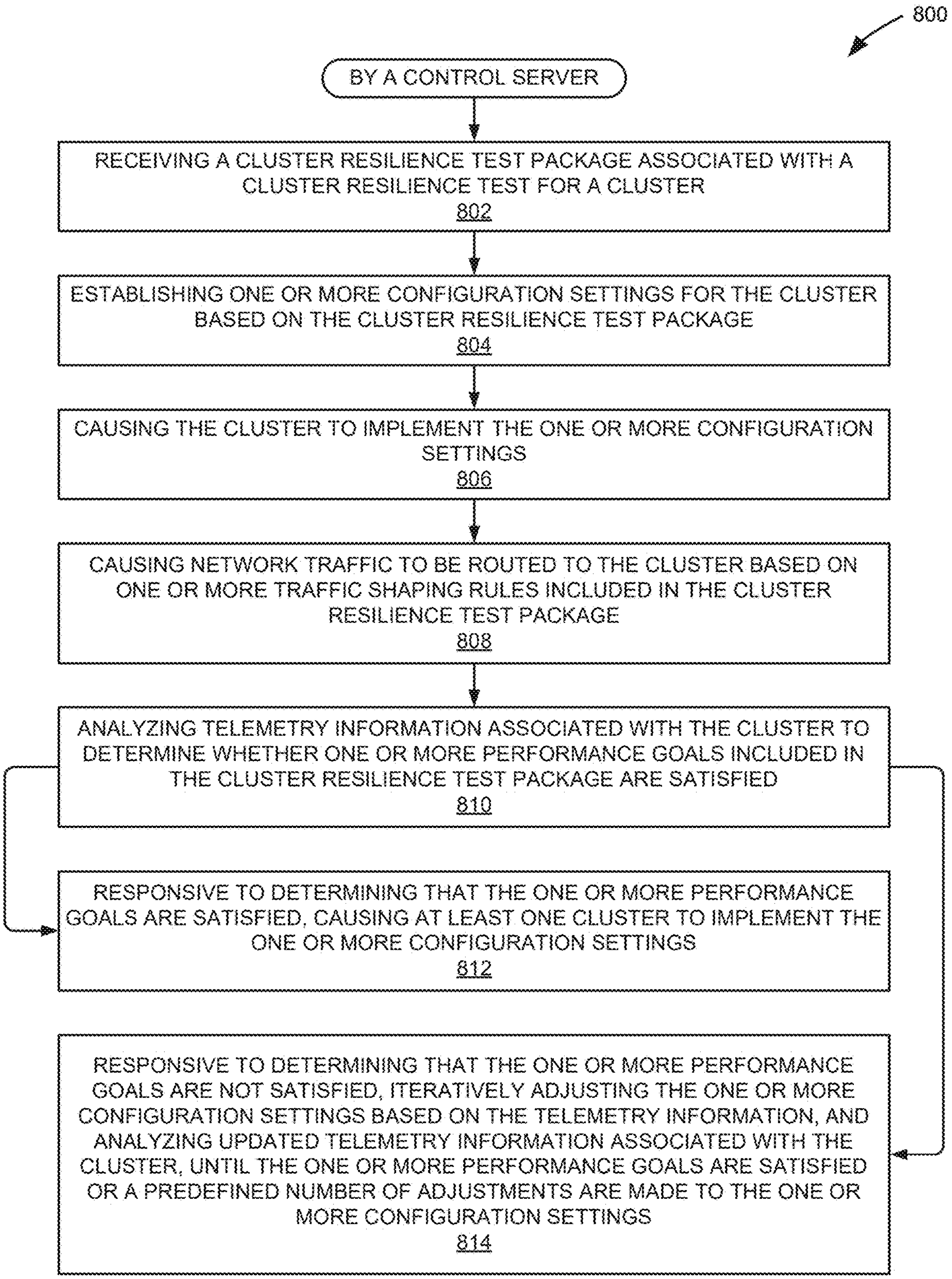
FIG. 8 illustrates a method for automatically testing clusters within a network for resilience, according to various embodiments.

FIG. 8 illustrates a method 800 for automatically testing clusters within a network for resilience, according to various embodiments of the present disclosure. Although the method steps are described with reference to the systems of FIGS. 1-5, persons skilled in the art will understand that any system configured to implement the method steps, in any order, falls within the scope of the present disclosure.

As shown, a method 800 begins at step 802, where the control server 120 receives a cluster resilience test package associated with a cluster resilience test for a cluster (e.g., as described above in conjunction with FIGS. 1-6).

At step 804, the control server 120 establishes one or more configuration settings for the cluster based on the cluster resilience test package (e.g., as described above in conjunction with FIGS. 1-6).

At step 806, the control server 120 causes the cluster to implement the one or more configuration settings (e.g., as described above in conjunction with FIGS. 1-6).

At step 808, the control server 120 causes network traffic to be routed to the cluster based on one or more traffic shaping rules included in the cluster resilience test package (e.g., as described above in conjunction with FIGS. 1-6).

At step 810, the control server 120 analyzes telemetry information associated with the cluster to determine whether one or more performance goals included in the cluster resilience test package are satisfied (e.g., as described above in conjunction with FIGS. 1-6).

At step 812, the control server 120, responsive to determining that the one or more performance goals are satisfied, causes at least one cluster to implement the one or more configuration settings (e.g., as described above in conjunction with FIGS. 1-6).

At step 814, the control server 120, responsive to determining that the one or more performance goals are not satisfied, iteratively adjusts the one or more configuration settings based on the telemetry information, and analyzes updated telemetry information associated with the cluster, until the one or more performance goals are satisfied or a threshold, predefined number, etc., of adjustments are made to the one or more configuration settings (e.g., as described above in conjunction with FIGS. 1-6).

In sum, identifying important clusters 122 in the network infrastructure 100 is essential for maintaining resilience and efficiency. Important clusters 122 typically manage core functions or experience the highest levels of traffic, meaning that any issues with such clusters 122 can lead to significant service disruptions. By proactively identifying important clusters 122, the control server 120 can focus resilience testing and optimization efforts where they matter most, to help ensure that critical points of service remain stable and responsive under varying conditions. Such a focused approach allows the network infrastructure 100 to maintain high availability and reliability, even as demands fluctuate. The automation process also extends to identifying other clusters 122 in the network infrastructure 100 that are the same or similar to the cluster 122 that is tested for resiliency. By recognizing clusters 122 with similar workloads, traffic patterns, or resource dependencies, the optimized configuration settings can be propagated to such clusters 122, thereby creating uniformity in resilience across the network infrastructure 100.

One technical advantage of the disclosed techniques relative to the prior art is that the disclosed techniques streamline the process of determining and addressing potential weaknesses in a distributed computing environment. In particular, using the techniques disclosed herein, clusters that are critical to the operation of a service can be identified. Doing so eliminates the gaps and inconsistencies involved in manual testing approaches, where critical clusters are often difficult to identify, and, consequently, are overlooked and not tested for resilience. In turn, such clusters can be continuously and accurately tested under a wide range of simulated load conditions, to thereby ensure that relevant traffic patterns, usage spikes, and failure scenarios are accounted for. Doing so eliminates the gaps and inconsistencies involved in manual testing approaches, where incomplete or imprecise tests may lead to critical stress points being overlooked. The techniques disclosed herein can also be used to effectively identify optimal configurations for handling load spikes, thereby reducing the time and effort required to tune clusters for performance and reliability. Additionally, the automation techniques disclosed herein enable the efficient replication of such configurations across other clusters with built-in validation checks, which can be used to effect uniform application where appropriate. These technical advantages provide one or more technological advancements over prior art approaches.

1. In some embodiments, a computer-implemented method for automatically testing clusters within a network for resilience comprises receiving a cluster resilience test package associated with a cluster resilience test for a cluster; establishing one or more configuration settings for the cluster based on the cluster resilience test package; causing the cluster to implement the one or more configuration settings; causing network traffic to be routed to the cluster based on one or more traffic shaping rules included in the cluster resilience test package; analyzing telemetry information associated with the cluster to determine whether one or more performance goals included in the cluster resilience test package are satisfied; responsive to determining that the one or more performance goals are satisfied, causing at least one cluster to implement the one or more configuration settings; and responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

2. The computer-implemented method of clause 1, wherein the one or more configuration settings include at least one of a set of autoscaling rules to be implemented by the cluster or a set of load shedding rules to be implemented by the cluster, and the one or more performance goals are associated with at least one of a success buffer, a failure buffer, or a recovery time constant associated with the cluster.

3. The computer-implemented method of clause 2, wherein the success buffer is associated with a first amount of additional load that can be handled by the cluster before service degradation occurs, the failure buffer is associated with a second amount of additional load that can be handled by the cluster before service failure occurs, and the recovery time constant represents an amount of time required for the success buffer to recover relative to an occurrence of a load spike experienced by the cluster.

4. The computer-implemented method of clause 2, wherein the cluster implements at least one of one or more load shedding operations in accordance with the set of load shedding rules or one or more autoscaling operations in accordance with the set of autoscaling rules.

5. The computer-implemented method of clause 2, wherein the one or more performance goals are satisfied when the telemetry information indicates that a recovery time exhibited by the cluster satisfies a threshold level of alignment with the recovery time constant.

6. The computer-implemented method of clause 1, wherein the cluster comprises a clone of a different cluster that is operating within a service and that is generated in conjunction with carrying out the cluster resilience test.

7. The computer-implemented method of clause 1, wherein an amount of the network traffic routed to the cluster is multiple times larger than an average amount of network traffic managed by the cluster.

8. The computer-implemented method of clause 1, wherein causing the at least one cluster to implement the one or more configuration settings comprises scheduling the at least one cluster to implement the one or more configuration settings during a time at which the at least one cluster experiences a threshold amount of network traffic.

9. The computer-implemented method of clause 1, wherein the at least one cluster includes the cluster and at least one different cluster.

10. The computer-implemented method of clause 9, further comprising, prior to causing the at least one cluster to implement the one or more configuration settings, determining that the at least one different cluster and the cluster satisfy a threshold level of similarity.

11. In some embodiments, one or more non-transitory computer readable media storing instructions that, when executed by one or more processors, cause the one or more processors to automatically test clusters within a network for resilience, by performing the operations of receiving a cluster resilience test package associated with a cluster resilience test for a cluster; establishing one or more configuration settings for the cluster based on the cluster resilience test package; causing the cluster to implement the one or more configuration settings; causing network traffic to be routed to the cluster based on one or more traffic shaping rules included in the cluster resilience test package; analyzing telemetry information associated with the cluster to determine whether one or more performance goals included in the cluster resilience test package are satisfied; responsive to determining that the one or more performance goals are satisfied, causing at least one cluster to implement the one or more configuration settings; and responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

12. The one or more non-transitory computer readable media of clause 11, wherein the one or more configuration settings include at least one of a set of autoscaling rules to be implemented by the cluster or a set of load shedding rules to be implemented by the cluster, and the one or more performance goals are associated with at least one of a success buffer, a failure buffer, or a recovery time constant associated with the cluster.

13. The one or more non-transitory computer readable media of clause 12, wherein the success buffer is associated with a first amount of additional load that can be handled by the cluster before service degradation occurs, the failure buffer is associated with a second amount of additional load that can be handled by the cluster before service failure occurs, and the recovery time constant represents an amount of time required for the success buffer to recover relative to an occurrence of a load spike experienced by the cluster.

14. The one or more non-transitory computer readable media of clause 12, wherein the cluster implements at least one of one or more load shedding operations in accordance with the set of load shedding rules or one or more autoscaling operations in accordance with the set of autoscaling rules.

15. The one or more non-transitory computer readable media of clause 12, wherein the one or more performance goals are satisfied when the telemetry information indicates that a recovery time exhibited by the cluster satisfies a threshold level of alignment with the recovery time constant.

16. The one or more non-transitory computer readable media of clause 11, wherein the cluster comprises a clone of a different cluster that is operating within a service and that is generated in conjunction with carrying out the cluster resilience test.

17. The one or more non-transitory computer readable media of clause 11, wherein a traffic management server causes the network traffic to be routed to the cluster based on the one or more traffic shaping rules.

18. The one or more non-transitory computer readable media of clause 11, wherein a set of load shedding rules included in the one or more configuration settings causes the cluster to divert the network traffic to at least one other cluster in accordance with the set of load shedding rules.

19. The one or more non-transitory computer readable media of clause 11, wherein a set of autoscaling rules included in the one or more configuration settings causes the cluster to increase or decrease resources utilized by the cluster.

20. In some embodiments, a system comprises one or more memories that include instructions, and one or more processors that are coupled to the one or more memories, and that, when executing the instructions, are configured to perform the operations of receiving a cluster resilience test package associated with a cluster resilience test for a cluster; establishing one or more configuration settings for the cluster based on the cluster resilience test package; causing the cluster to implement the one or more configuration settings; causing network traffic to be routed to the cluster based on one or more traffic shaping rules included in the cluster resilience test package; analyzing telemetry information associated with the cluster to determine whether one or more performance goals included in the cluster resilience test package are satisfied; responsive to determining that the one or more performance goals are satisfied, causing at least one cluster to implement the one or more configuration settings; and responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically testing clusters within a network for resilience, the method comprising:

receiving a cluster resilience test package associated with a cluster resilience test for a cluster;

establishing one or more configuration settings for the cluster based on the cluster resilience test package;

causing the cluster to implement the one or more configuration settings;

causing network traffic to be routed to the cluster based on one or more traffic shaping rules included in the cluster resilience test package;

analyzing telemetry information associated with the cluster to determine whether one or more performance goals included in the cluster resilience test package are satisfied;

responsive to determining that the one or more performance goals are satisfied, causing at least one cluster to implement the one or more configuration settings; and responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

2. The computer-implemented method of claim 1, wherein the one or more configuration settings include at least one of a set of autoscaling rules to be implemented by the cluster or a set of load shedding rules to be implemented by the cluster, and the one or more performance goals are associated with at least one of a success buffer, a failure buffer, or a recovery time constant associated with the cluster.

3. The computer-implemented method of claim 2, wherein the success buffer is associated with a first amount of additional load that can be handled by the cluster before service degradation occurs, the failure buffer is associated with a second amount of additional load that can be handled by the cluster before service failure occurs, and the recovery time constant represents an amount of time required for the success buffer to recover relative to an occurrence of a load spike experienced by the cluster.

4. The computer-implemented method of claim 2, wherein the cluster implements at least one of one or more load shedding operations in accordance with the set of load shedding rules or one or more autoscaling operations in accordance with the set of autoscaling rules.

5. The computer-implemented method of claim 2, wherein the one or more performance goals are satisfied when the telemetry information indicates that a recovery time exhibited by the cluster satisfies a threshold level of alignment with the recovery time constant.

6. The computer-implemented method of claim 1, wherein the cluster comprises a clone of a different cluster that is operating within a service and that is generated in conjunction with carrying out the cluster resilience test.

7. The computer-implemented method of claim 1, wherein an amount of the network traffic routed to the cluster is multiple times larger than an average amount of network traffic managed by the cluster.

8. The computer-implemented method of claim 1, wherein causing the at least one cluster to implement the one or more configuration settings comprises scheduling the at least one cluster to implement the one or more configuration settings during a time at which the at least one cluster experiences a threshold amount of network traffic.

9. The computer-implemented method of claim 1, wherein the at least one cluster includes the cluster and at least one different cluster.

10. The computer-implemented method of claim 9, further comprising, prior to causing the at least one cluster to implement the one or more configuration settings:

determining that the at least one different cluster and the cluster satisfy a threshold level of similarity.

11. One or more non-transitory computer readable media storing instructions that, when executed by one or more processors, cause the one or more processors to automatically test clusters within a network for resilience, by performing the operations of:

receiving a cluster resilience test package associated with a cluster resilience test for a cluster;

establishing one or more configuration settings for the cluster based on the cluster resilience test package;

causing the cluster to implement the one or more configuration settings;

causing network traffic to be routed to the cluster based on one or more traffic shaping rules included in the cluster resilience test package;

analyzing telemetry information associated with the cluster to determine whether one or more performance goals included in the cluster resilience test package are satisfied;

responsive to determining that the one or more performance goals are satisfied, causing at least one cluster to implement the one or more configuration settings; and responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

12. The one or more non-transitory computer readable media of claim 11, wherein the one or more configuration settings include at least one of a set of autoscaling rules to be implemented by the cluster or a set of load shedding rules to be implemented by the cluster, and the one or more performance goals are associated with at least one of a success buffer, a failure buffer, or a recovery time constant associated with the cluster.

13. The one or more non-transitory computer readable media of claim 12, wherein the success buffer is associated with a first amount of additional load that can be handled by the cluster before service degradation occurs, the failure buffer is associated with a second amount of additional load that can be handled by the cluster before service failure occurs, and the recovery time constant represents an amount of time required for the success buffer to recover relative to an occurrence of a load spike experienced by the cluster.

14. The one or more non-transitory computer readable media of claim 12, wherein the cluster implements at least one of one or more load shedding operations in accordance with the set of load shedding rules or one or more autoscaling operations in accordance with the set of autoscaling rules.

15. The one or more non-transitory computer readable media of claim 12, wherein the one or more performance goals are satisfied when the telemetry information indicates that a recovery time exhibited by the cluster satisfies a threshold level of alignment with the recovery time constant.

16. The one or more non-transitory computer readable media of claim 11, wherein the cluster comprises a clone of a different cluster that is operating within a service and that is generated in conjunction with carrying out the cluster resilience test.

17. The one or more non-transitory computer readable media of claim 11, wherein a traffic management server causes the network traffic to be routed to the cluster based on the one or more traffic shaping rules.

18. The one or more non-transitory computer readable media of claim 11, wherein a set of load shedding rules included in the one or more configuration settings causes the cluster to divert the network traffic to at least one other cluster in accordance with the set of load shedding rules.

19. The one or more non-transitory computer readable media of claim 11, wherein a set of autoscaling rules included in the one or more configuration settings causes the cluster to increase or decrease resources utilized by the cluster.

20. A system, comprising:

one or more memories that include instructions; and one or more processors that are coupled to the one or more memories and, when executing the instructions, are configured to perform the operations of:

receiving a cluster resilience test package associated with a cluster resilience test for a cluster;

establishing one or more configuration settings for the cluster based on the cluster resilience test package;

causing the cluster to implement the one or more configuration settings;

causing network traffic to be routed to the cluster based on one or more traffic shaping rules included in the cluster resilience test package;

analyzing telemetry information associated with the cluster to determine whether one or more performance goals included in the cluster resilience test package are satisfied;

responsive to determining that the one or more performance goals are satisfied, causing at least one cluster to implement the one or more configuration settings; and responsive to determining that the one or more performance goals are not satisfied, iteratively adjusting the one or more configuration settings based on the telemetry information, and analyzing updated telemetry information associated with the cluster, until the one or more performance goals are satisfied or a predefined number of adjustments are made to the one or more configuration settings.

* * * * *